United States Patent [19]
Philippe et al.

[11] Patent Number: 6,083,471
[45] Date of Patent: Jul. 4, 2000

[54] METHOD AND CATALYST FOR CATALYTICALLY OXIDIZING A LOW CONCENTRATION OF $H_2S$ IN A GAS TO GIVE SULPHUR

[75] Inventors: André Philippe, Orthez; Sabine Savin-Poncet, Buros; Jean Nougayrede, Pau; Marc Ledoux, Strasbourg; Cuong Pham Huu, Saverne; Claude Crouzet, Strasbourg, all of France

[73] Assignee: Elf Exploration Production, Courbevoie, France

[21] Appl. No.: 08/875,703

[22] PCT Filed: Nov. 20, 1995

[86] PCT No.: PCT/FR95/01524

§ 371 Date: Nov. 19, 1997

§ 102(e) Date: Nov. 19, 1997

[87] PCT Pub. No.: WO97/19019

PCT Pub. Date: May 29, 1997

[51] Int. Cl.[7] ............................ C01B 17/04; B01D 53/52; B01J 27/224

[52] U.S. Cl. ..................................... 423/573.1; 423/574.1; 423/576.2; 423/576.8; 502/300; 502/305; 502/324; 502/344; 502/517

[58] Field of Search .............................. 423/573.1, 574.1, 423/576.2, 576.8; 502/84, 100, 300, 517, 527.12, 527.15, 305, 324, 344

[56] References Cited

U.S. PATENT DOCUMENTS

| 42,898 | 5/1864 | Cleland ................................. 423/561.1 |
| 2,386,390 | 10/1945 | Fernelius ............................... 423/573.1 |
| 4,914,070 | 4/1990 | Ledoux et al. ............................ 502/178 |
| 5,607,657 | 3/1997 | Philippe et al. ...................... 423/576.2 |

FOREIGN PATENT DOCUMENTS

| 0 078 690 A2 | 5/1983 | European Pat. Off. . |
| 0 134 594 A1 | 3/1985 | European Pat. Off. . |
| 0 140 045 A2 | 5/1985 | European Pat. Off. . |
| 0 313 480 A1 | 4/1989 | European Pat. Off. . |
| 0 422 999 A1 | 4/1991 | European Pat. Off. . |
| 0 440 569 A2 | 8/1991 | European Pat. Off. . |
| 0 511 919 A1 | 11/1992 | European Pat. Off. . |
| 0 543 751 A1 | 5/1993 | European Pat. Off. . |
| 0 543 752 A1 | 5/1993 | European Pat. Off. . |
| 0 640 004 B1 | 3/1995 | European Pat. Off. . |
| 2 277 877 A1 | 3/1976 | France . |
| 2 511 663 A1 | 2/1983 | France . |
| 2 540 092 A1 | 8/1984 | France . |
| 2 589 140 A1 | 4/1987 | France . |
| 2 589 141 A1 | 4/1987 | France . |
| 2589082 | 4/1987 | France . |
| 129 037 | 12/1977 | Germany . |
| 58-150438 | 9/1983 | Japan ....................................... 502/34 |
| 1 504 059 | 3/1978 | United Kingdom . |
| WO 83/02068 | 6/1983 | WIPO . |
| WO 87 02653 | 5/1987 | WIPO . |
| WO 87/02653 | 5/1987 | WIPO . |
| WO 94 21555 | 9/1994 | WIPO . |
| WO 94/21555 | 9/1994 | WIPO . |

OTHER PUBLICATIONS

Kohl et al. Gas Purification 4th Edition Gulf Publishing Co. Houston TX USA ISBN 0–87201–314–6 pp. 457–460, 1985.

*Primary Examiner*—Steven P. Griffin
*Assistant Examiner*—Timothy C Vanoy
*Attorney, Agent, or Firm*—Schnader Harrison Segal & Lewis LLP

[57] ABSTRACT

A process for catalytically oxidizing the $H_2S$ present at low concentration in a gas to sulphur wherein the gas together with a gas containing free oxygen in a quantity to provide and $O_2$ to $H_2S$ mole ratio ranging from 0.05 to 10 are contacted with a catalyst for selectively oxidizing $H_2S$ to sulphur, the catalyst comprising a support based on silicon carbide associated with a catalytic active phase containing at least one transition metal such as Fe, Ni, Cr, Co, Cu, Ag, Mn, Mo, Ti, W or V, in a form of a metal compound and/or in the elemental state. Prior to treating the gas, the oxidation catalyst is subjected to an activation treatment which loads the active phase of the catalyst to provide maximum sulphurization of the metal of the catalyst. In an alternate embodiment, the oxidation of the $H_2S$ is performed below the dew point of the sulphur. In another embodiment, the oxidation is performed at a temperature above the dew point of sulphur and in particular between 200° C. and 500° C. Also disclosed is a catalyst for selectively oxidizing $H_2S$ to sulphur which comprises a catalytically active phase based on at least one transition metal such as indicated above in combination with a silicon carbide support.

57 Claims, No Drawings

METHOD AND CATALYST FOR CATALYTICALLY OXIDIZING A LOW CONCENTRATION OF $H_2S$ IN A GAS TO GIVE SULPHUR

This application is a national stage filing under 35 U.S.C. 371 of PCT/FR95/01524, filed Nov. 20, 1995.

The invention relates to a process for oxidizing the $H_2S$ present at a low concentration in a gas directly to sulphur by a catalytic route. It also relates to a catalyst for making use of this process.

In order to recover $H_2S$ present at a low concentration, namely a concentration of less than 20% by volume and more particularly-,between 0.001% and 20% and very especially ranging from 0.001% to 10% by volume, in gases of various origins, it is possible to make use, in particular, of processes involving a direct catalytic oxidation of the $H_2S$ to sulphur according to the reaction $H_2S + \frac{1}{2}O_2 \rightarrow S + H_2O$.

In such processes, the gas to be treated, containing the $H_2S$ mixed with an appropriate quantity of a gas containing free oxygen, for example air, oxygen or else oxygen-enriched air, is passed in contact with a catalyst for oxidizing $H_2S$ to sulphur, this contact being brought about at temperatures which are either higher than the dew point of the sulphur formed, in which case the sulphur formed is present in the vapour state in the reaction mixture resulting from the reaction, or else at temperatures which are lower than the dew point of the sulphur formed, in which case the said sulphur is deposited on the catalyst, and this requires a regeneration of the sulphur-laden catalyst at regular intervals by purging with a non-oxidizing gas which is at a temperature of between 200° C. and 500° C.

In particular, oxidation of $H_2S$ to sulphur at temperatures above the dew point of sulphur, that is to say at temperatures above approximately 180° C., can be carried out in contact with a catalyst consisting of titanium oxide (EP-A-0078690), of titanium oxide containing an alkaline-earth metal sulphate (WO-A-8302068), of titanium oxide containing nickel oxide and optionally aluminium oxide (EP-A-0140045), of an oxide of the titanium oxide, zirconium oxide or silica type used in combination with one or more compounds of transition metals chosen from Fe, Cu, Zn, Cd, Cr, Mo, W, Co and Ni, preferably Fe, and optionally with one or more compounds of precious metals chosen from Pd, Pt, Ir and Rh, preferably Pd (FR-A-2511663), or else of a thermally stabilized alumina used in combination with one or more compounds of transition metals such as the abovementioned, especially Fe, and optionally with one or more compounds of precious metals chosen from Pd, Pt, Ir and Rh (FR-A-2540092).

Oxidation of $H_2S$ to sulphur, the operation being carried out at temperatures such that the sulphur formed is deposited on the catalyst, can, for its part, be performed in contact with a catalyst consisting, for example, of one or more compounds such as salts, oxides or sulphides of transition metals, for example Fe, Cu, Cr, Mo, W, V, Co, Ni, Ag and Mn, in combination with a support of the activated alumina, bauxite, silica/alumina or zeolite type (FR-A-2277877). This oxidation of $H_2S$ with deposition of sulphur on the catalyst can also be carried out in contact with a catalyst consisting of a catalytic phase chosen from the oxides, salts or sulphides of the metals V, Mo, W, Ni and Co used in combination with an active charcoal support (French Patent Application No. 9302996 of 16.03.1993).

The catalysts such as the abovementioned, consisting of a catalytic phase based on at least one oxide, salt or sulphide of a transition metal, which phase is used in combination with a support consisting of at least one material chosen from alumina, titanium oxide, zirconium oxide, silica, zeolites, silica/alumina mixtures, silica/titanium oxide mixtures and active charcoal, which are used for the catalytic oxidation of $H_2S$ to sulphur, still exhibit certain shortcomings on prolonged use. In particular, the catalysts in which the support is based on alumina are capable of changing with time by sulphation. As regards the catalysts in which the support consists of active charcoal, precautions must be taken during their use in order to avoid combustion of the support. Moreover, for these various catalysts, the catalytic phase with which the support is impregnated has a tendency to migrate into the lattice of the support, which makes it difficult, indeed even often impossible, to recover the metal from the catalytic phase in the spent catalyst. Finally, the abovementioned catalysts have a mediocre thermal conductivity, which does not make it possible to exert efficient control over the temperature within the catalytic beds containing them by heat exchange with a coolant fluid.

It has now been found that it was possible to overcome the disadvantages of the catalysts of the type mentioned above used for the catalytic oxidation of $H_2S$ to sulphur, and thus to obtain a process resulting in an improved selectivity for sulphur which is maintained durably with time, by forming the support for these catalysts from silicon carbide.

The silicon carbide support, in contrast to an alumina support, is not subject to sulphation and, unlike an active charcoal support, is not combustible. Moreover, migration of the catalytic phase into the lattice of the silicon carbide support is not observed, which makes it possible to recover the metals from the catalytic phase when the catalyst is spent, such a possibility assuming particular importance in the case where the catalytic phase contains harmful substances, such as nickel compounds. Finally, the silicon carbide support has good thermal conductivity which, especially for use of the catalyst in cooled catalytic beds, makes it possible to obtain a flatter temperature front within the catalytic bed and consequently better selectivity for sulphur.

The subject of the invention is therefore a process for oxidizing $H_2S$ present at a low concentration in a gas directly to sulphur by a catalytic route, the said process being of the type in which the said gas containing $H_2S$ is passed with a gas containing free oxygen, in a quantity such as to provide an $O_2:H_2S$ molar ratio ranging from 0.05 to 10, in contact with a catalyst for selectively oxidizing $H_2S$ to sulphur consisting of a catalytically active phase used in combination with a support, the said active phase containing at least one metal existing in the form of a metal compound and/or in the elemental state, and it is characterized in that the said support consists of silicon carbide.

In particular, the active phase used in combination with the silicon carbide support in order to form the oxidation catalyst according to the invention is advantageously composed of at least one transition metal, such as nickel, cobalt, iron, copper, silver, manganese, molybdenum, chromium, titanium, tungsten and vanadium, the said metal being in the oxide, sulphide or salt form and/or in the elemental state. The said active phase, expressed as weight of metal, most often represents 0.1 to 20%, more particularly 0.2 to 15% and more especially 0.2 to 7% of the weight of the oxidation catalyst. The silicon carbide support advantageously forms at least 40% and more particularly at least 50% of the weight of the oxidation catalyst.

The specific surface of the catalyst for the oxidation of $H_2S$ to sulphur can vary quite widely, depending on the conditions of implementation of the oxidation process. Advantageously, the said specific surface, determined by the BET nitrogen adsorption method at the temperature of liquid nitrogen (NF standard X 11–621), can represent 2 $m^2/g$ to 600 $m^2/g$ and more especially from 10 $m^2/g$ to 300 $m^2/g$.

The oxidation catalyst may be prepared by making use of the various known methods for incorporating one or more metal compounds into a divided solid forming a catalyst support. In particular, it is possible to carry out the operation by impregnating the silicon carbide support, which is in the form of a powder, pellets, granules, extrudates or other agglomerate forms, with a solution or a sol, in a solvent such as water, of the desired metal compound(s), followed by drying of the impregnated support and calcining of the dried product at temperatures which can range from 250° C. to 500° C., the operation being optionally carried out in an inert atmosphere. The calcined catalyst may be subjected to a reduction treatment under hydrogen, for example between 200° C. and 500° C., in order to convert the metal of the metal compound present in its active phase to the elemental state. It is also possible to envisage preparing the catalyst by carrying out the operation so as to insert catalytically active metal atoms, such as the abovementioned, into the crystal lattice of the silicon carbide.

The silicon carbide used to form the support for the catalyst for oxidizing $H_2S$ to sulphur may consist of any one of the known silicon carbides, with the proviso that it has the required specific surface characteristics, namely a specific surface, determined by the BET nitrogen adsorption method, ranging from 2 $m^2/g$ to 600 $m^2/g$ and more especially from 10 $m^2/g$ to 300 $m^2/g$.

In particular, the said silicon carbide may be prepared by making use of any one of the techniques which are described in the citations EP-A-0313480 (corresponding to U.S. Pat. No. 4,914,070), EP-A-0440569, EP-A-0511919, EP-A-0543751 and EP-A-0543752.

The gas containing free oxygen which is employed for oxidizing to sulphur the $H_2S$ present in the gas to be treated is generally air, although it is possible to employ pure oxygen, oxygen-enriched air or else mixtures of various proportions of oxygen and of an inert gas other than nitrogen.

The gas containing free oxygen and the gas to be treated containing $H_2S$ can be brought separately into contact with the oxidation catalyst. However, in order to obtain a very homogeneous gaseous reaction mixture during the contact with the catalyst, it is preferable first of all to mix the gas to be treated containing $H_2S$ with the gas containing free oxygen and to bring the mixture thus produced into contact with the oxidation catalyst.

As indicated above, the gas containing free oxygen is employed in a quantity such as to provide an $O_2:H_2S$ molar ratio ranging from 0.05 to 10, more particularly from 0.1 to 7 and very especially from 0.2 to 4 in the reaction mixture which has been brought into contact with the catalyst for oxidizing $H_2S$ to sulphur.

The contact times of the gaseous reaction mixture with the oxidation catalyst may range from 0.5 of a second to 20 seconds and preferably from 1 second to 12 seconds, these values being given in standard pressure and temperature conditions.

The process for catalytically oxidizing $H_2S$ to sulphur according to the invention may be implemented at temperatures above the dew point of the sulphur formed during the reaction for oxidizing $H_2S$, the said sulphur then being present in the vapour form in the reaction mixture which is in contact with the catalyst and which is collected at the exit of the catalytic oxidation zone. It is also possible to implement the oxidation process according to the invention by carrying out the operation at temperatures below the dew point of the sulphur formed during the oxidation reaction, the said sulphur then being deposited on the catalyst and the gaseous effluent collected at the exit of the oxidation zone being substantially free of sulphur. The temperatures for implementing the process according to the invention may advantageously be chosen between 30° C. and 1000° C. For implementation of the process at temperatures above the dew point of the sulphur formed, temperatures of between 180° C. and 1000° C. and more especially between 200° C. and 900° C. are chosen. For implementation of the process at temperatures below the dew point of the sulphur formed, temperatures in the range 30° C. to 180° C. and more particularly in the range 80° C. to 160° C., which encloses the solidification range for sulphur in the vicinity of 120° C., are chosen.

Prior to the stage of implementing the oxidation reaction, the oxidation catalyst according to the invention, and in particular the oxidation catalyst in which the active phase contains nickel, may be subjected to activation by bringing the said catalyst into contact with elemental sulphur, in a quantity representing a slight excess, for example an excess which may range up to 300 mol %, with respect to the stoichiometric quantity corresponding to maximum sulphurization of the metal of the active phase of the catalyst, the said operation of bringing into contact being carried out under an inert atmosphere, for example a helium or argon atmosphere, at temperatures of between 250° C. and 400° C. and for a period of time which is sufficient, most often between 1 hour and 4 hours, to obtain maximum sulphurization of the metal of the active phase of the catalyst.

The catalyst according to the invention, especially a nickel catalyst, initially activated as indicated above, makes it possible to obtain a degree of conversion of $H_2S$ to sulphur which is equal to 100%, from the beginning of the oxidation of $H_2S$ by the oxygen of the gas containing free oxygen.

The catalyst according to the invention, and very particularly the nickel catalyst, may also form the subject of an initial activation equivalent to the activation with elemental sulphur described above by bringing the said catalyst into contact with a gas mixture containing $H_2S$ and an inert gas, the operation being carried out at temperatures of between 250° C. and 400° C. for a period of time which is sufficient, in general between 1 hour and 15 hours, to produce maximum sulphurization of the metal of the active phase of the catalyst, it being possible for the said gas mixture to contain especially between 0.2% and 30% or more of $H_2S$ by volume. In particular, the gas mixture containing $H_2S$ which is used for the initial activation of the oxidation catalyst may consist of the gas to be treated, when the latter does not contain, in addition to $H_2S$, components capable of reacting, at the activation temperatures, with the active phase of the catalyst.

The gas containing $H_2S$ at a low concentration which is treated by the process according to the invention may come from various sources. In particular, such a gas may be a natural gas of low $H_2S$ content or else a gas originating from the gasification of coal or of heavy oils, or even a gas resulting from the hydrogenation of a residual gas., for example a sulphur plant residual gas, containing sulphur compounds such as $SO_2$, mercaptans, COS or $CS_2$, which can be converted to $H_2S$ by the action of hydrogen or of water vapour, or yet again a gas resulting from the treatment, in contact with a Claus catalyst capable of promoting the sulphur-formation reaction between $H_2S$ and $SO_2$, of a gaseous effluent containing $H_2S$ and $SO_2$ in an $H_2S:SO_2$ molar ratio higher than 2:1, and such that the said resulting gas contains especially $H_2S$ and no or very little $SO_2$ as sulphur compounds. The process according to the invention may be applied to the treatment of a gas containing $H_2S$ at a concentration of between 0.001% and 25% by volume and more especially ranging from 0.01% to 20% by volume. The gas to be treated may also contain organic sulphur compounds such as mercaptans, COS or $CS_2$, at an overall concentration which may range up to approximately 1% by volume. Gases containing $H_2S$ at a concentration greater than 25% by volume could be treated by using the process according to the invention; however, in this case, it is preferable to use the conventional processes for the production of sulphur containing a thermal reaction stage.

The gas containing $H_2S$ which is subjected to oxidation on contact with the catalyst containing a silicon carbide support may be free of water or substantially free of water or, in contrast, contain a more or less large quantity of water. Thus, a gas containing $H_2S$ which has a water content which may range from 0% to approximately 50% by volume may be treated according to the invention. Advantageously, when the oxidation reaction of the gas containing $H_2S$, in contact with a catalyst according to the invention, very particularly a nickel catalyst, containing a silicon carbide support, is implemented at temperatures below the dew point of the sulphur formed by the oxidation and more particularly at temperatures below the melting point of the sulphur, the presence, in the gas to be treated containing $H_2S$, of a quantity of water ranging from 10% to 50% by volume and more especially from 15% to 30% by volume makes it possible to substantially increase the period of time during which the efficiency of the catalyst is maintained at an optimum level.

When the process according to the invention is implemented at temperatures of between 180° C. and 1000° C. and more particularly between 200° C. and 900° C., the operation of bringing the gas to be treated into contact with the oxidation catalyst containing a silicon carbide support may be carried out in a single oxidation zone containing the oxidation catalyst, especially when the $H_2S$ content of the gas to be treated is not greater than approximately 5% by volume, or alternatively in a plurality of oxidation zones arranged in series, each containing the oxidation catalyst, especially when the $H_2S$ content of the gas to be treated is greater than approximately 5% by volume, the said single oxidation zone or each of the zones of the plurality of oxidation zones operating at temperatures within the above-mentioned ranges. Each of the oxidation zones functions in the range of temperatures corresponding to a substantially optimum selectivity of the catalyst for the formation of sulphur.

At the exit of the single oxidation zone or of each of the zones of the plurality of oxidation zones in series, a gaseous effluent laden with sulphur vapour is collected, which gaseous effluent, before any subsequent treatment for removing $H_2S$, is caused to pass into a zone for separating sulphur in which it is freed from the greater part of the sulphur which it contains by condensing. When the gas containing $H_2S$ is treated by passing into a plurality of oxidation zones in series containing the oxidation catalyst containing a silicon carbide support, only a fraction of the $H_2S$ present in the gas to be treated is oxidized to sulphur in each of the said zones, the oxidation being carried out by injecting into the zone concerned, preferably mixed with the said gas conveyed to this zone, the appropriate quantity of the gas containing free oxygen for carrying out this oxidation to sulphur. The quantity of $H_2S$ subjected to oxidation to sulphur in each of the zones, which represents a fraction of the total quantity of $H_2S$ in the gas to be treated, is advantageously between 2% and 5% by volume of the gas to be treated and the number of catalytic oxidation zones is chosen so that the gas to be treated arriving at the final catalytic zone contains not more than 5% by volume of $H_2S$.

If need be, the gaseous effluent, which is collected at the exit of the single oxidation zone or at the exit of the final zone of the plurality of oxidation zones in series, in the implementation at temperatures above the dew point of the sulphur formed, may be subjected to an additional purification treatment after separation of the sulphur which it optionally contains, the said treatment depending on the nature of the gaseous sulphur compounds remaining in the effluent.

The implementation of the process according to the invention at temperatures above the dew point of the sulphur formed may constitute, in particular, the stage for oxidizing $H_2S$ of the processes for removing sulphur compounds present in a residual gas described in the citations FR-A-2589141 and FR-A-2589082 or the stage for oxidizing $H_2S$ of the process for treating sour gas described in the citation FR-A-2589140. The said implementation may also form the stage for oxidizing $H_2S$ to sulphur in Claus stoichiometry used in the processes of the type described in the citation FR-A-2511663 or the citation FR-A-2540092, which processes comprise bringing a gas having an $H_2S$ content below 25% by volume into contact, the operation being carried out at high temperature, that is to say between 200° C. and 1000° C. and more particularly between 350° C. and 900° C., and in the presence of a catalyst for oxidizing $H_2S$, with a controlled quantity of a gas containing free oxygen, in order to form a gaseous effluent containing $H_2S$ and $SO_2$ in an $H_2S:SO_2$ molar ratio which is substantially equal to 2:1 and a certain proportion of sulphur, and then bringing the said gaseous effluent, after cooling and optionally separating the sulphur which it contains, into contact with a Claus catalyst, in order to form a new quantity of sulphur, the said Claus catalyst being arranged in a single catalytic converter or in a plurality of catalytic converters, for example two or three, in series.

When the process according to the invention is implemented at temperatures below the dew point of the sulphur formed during the reaction for oxidizing $H_2S$, that is to say at temperatures within the range 30° C. to 180° C. and more particularly in the range 80° C. to 160° C., the operation of bringing the gas to be treated, which in this embodiment preferably contains less than 5% by volume of $H_2S$ and very particularly less than 2% by volume of $H_2S$, into contact with the oxidation catalyst containing a silicon carbide support results in the formation of sulphur which is deposited on the catalyst.

If the $H_2S$ concentration and/or the temperature of the gas to be treated containing $H_2S$ brought into contact with the oxidation catalyst are such that, due to the high exothermicity of the reaction $H_2S+\frac{1}{2}O_2 \rightarrow S+H_2O$, the temperature of the reaction mixture, on conclusion of the oxidation, is capable of exceeding the temperature limit beyond which the reaction no longer has the desired selectivity, the heat given off by the said reaction is removed by subjecting the catalyst to cooling, by any known method. It is possible, for example, to carry out this cooling using a cold fluid circulating within the said catalyst, by indirect exchange of heat with the latter. It is alternatively possible to carry out the operation by placing the catalyst in a tubular reactor consisting of tubes arranged in a calandria with, for example, the catalyst present in the tubes and a cold fluid circulating between the tubes by the calandria. The catalytic oxidation can also be carried out in a multi-stage catalytic reactor with cooling of the reaction mixture between the successive stages by indirect exchange of heat with a cold fluid, exchange of heat taking place inside or outside the oxidation reactor.

If the gas to be treated contains, in addition to $H_2S$, a significant quantity of water, for example greater than 10% by volume, the temperatures for oxidizing $H_2S$ to sulphur below the dew point of the sulphur formed during the oxidation are preferably chosen in order to be above the dew point of the water present in the gas to be treated.

During the oxidation of $H_2S$ to sulphur at temperatures below the dew point of the sulphur formed, the oxidation catalyst gradually becomes laden with sulphur. Regeneration of the sulphur-laden catalyst is undertaken at regular intervals by purging the said catalyst with a non-oxidizing gas, the operation being carried out at temperatures of between 200° C. and 500° C. and preferably between 230° C. and 450° C., to vaporize the sulphur retained on the catalyst, and the regenerated catalyst is then cooled to a temperature below the dew point of the sulphur for a new implementation of the oxidation reaction, this cooling being carried out with a gas which is at a suitable temperature below 180° C.

The purging gas, employed for regenerating the sulphur-laden catalyst, may be such as methane, nitrogen, $CO_2$ or mixtures of such gases or may alternatively consist of a fraction of the gas stream originating from the oxidation stage or of a fraction of the gas to be treated. The purging gas employed for the abovementioned regeneration may optionally contain a certain proportion of a gaseous reducing compound such as, for example, $H_2$, CO or $H_2S$, at least during the final stage of the regeneration, that is to say after the vaporization of the greater part of the sulphur deposited on the oxidation catalyst.

The implementation of the oxidation reaction according to the invention at temperatures below the dew point of the sulphur formed may be carried out in a single oxidation zone, containing the oxidation catalyst containing a silicon carbide support, which operates alternately in an oxidation stage and in a regeneration/cooling stage. Such an implementation is adopted when the gas to be treated contains little $H_2S$ and when consequently the regeneration of the catalyst is not very frequent. The catalytic reaction is advantageously implemented in a plurality of oxidation zones, each containing the oxidation catalyst containing a silicon carbide support, which operate so that at least one of the said zones operates in a regeneration/cooling stage while the other zones are in a catalytic oxidation stage. It is also possible to operate by having one or more zones in an oxidation reaction stage, at least one zone in a regeneration stage and at least one zone in a cooling stage.

The gas employed for regenerating the oxidation catalyst preferably circulates in a closed circuit starting with a heating zone, passing successively through the catalytic zone being regenerated and a cooling zone, in which most of the sulphur present in the said gas is separated off by condensation, to return to the heating zone. The regenerating gas may, of course, also travel in an open circuit.

The gas used for cooling the regenerated oxidation catalyst is of the same type as that employed for regenerating the sulphur-laden catalyst. The said gas may optionally contain oxygen in a proportion which is less than or equal to that used in the catalytic oxidation stage. The regeneration gas and coolant gas circuits may be independent of one another. However, according to one embodiment, the regenerating gas circuit defined above may also comprise a bypass connecting the exit of its cooling zone to the entry of the zone being regenerated by bypassing its heating zone, and this makes it possible to short-circuit the said heating zone and thus to employ the regenerating gas as coolant gas.

The embodiment of the process according to the invention for oxidizing $H_2S$ to sulphur at temperatures below the dew point of the sulphur formed during the oxidation may advantageously form the stage for catalytic oxidation of $H_2S$ which follows the Claus reaction stage at a temperature below 180° C. in the process for the desulphurization of gas containing $H_2S$ described in the citation FR-A-2277877.

The invention is illustrated by the following examples, given without any limitation being implied.

EXAMPLE 1

The treatment was carried out of a gas consisting, by volume, of 1% of $H_2S$, 5% of $H_2O$ and 94% of $CO_2$, the operation being carried out at temperatures above the dew point of the sulphur formed, with the use of a catalyst composed of a silicon carbide support impregnated with an iron compound and with a chromium compound and containing, expressed as weight of metal with respect to the weight of the catalyst, 3.2% of iron and 0.35% of chromium.

The catalyst was prepared as follows. Silicon carbide grains, with a particle size between 0.8 mm and 1 mm and a BET specific surface of 78 $m^2/g$, were first of all impregnated with a solution of an iron compound and of a chromium compound at concentrations such as to provide the desired quantities of iron and of chromium in the resulting catalyst. The impregnated product obtained was dried at ambient temperature for 40 hours and then at 120° C. for 50 hours and was subsequently subjected to a calcination at 500° C. for 20 hours, in order to produce the catalyst.

The catalyst obtained contained, as indicated above, 3.2% by weight of iron and 0.35% by weight of chromium and had a BET specific surface equal to 77 $m^2/g$.

The gas containing $H_2S$ was treated in a stationary bed catalytic reactor containing 1.1 $m^3$ of catalyst, the said reactor being equipped, on the one hand, with a delivery conduit for the gas to be treated and, on the other hand, with a discharge conduit for the gases forming the exit of the reactor. The gas delivery conduit contained a branch connection for the injection of air as gas containing free oxygen and was additionally equipped with an indirect heat exchanger, operating as a heater, fitted between the branch connection for injection of air and the entry of the reactor. The gas exit conduit was equipped with a sulphur condenser cooled by circulation of steam. The gas is passed from the entry to the exit of the reactor through the catalyst bed.

The gas to be treated, introduced via the gas delivery conduit with a flow rate of 1000 $Nm^3/h$ and a temperature of 40° C., received, via the branch connection, an addition of air corresponding to a flow rate of 29 $Nm^3/h$, this air being injected at ambient temperature. The mixture of gas to be treated and of air, in which the $O_2:H_2S$ molar ratio was equal to 0.6, was brought to a temperature of 180° C., by passing into the heater, and was then injected into the reactor at this temperature. The contact time of the said mixture with the catalyst present in the reactor was equal to 4 seconds. The gaseous effluent exiting from the reactor, via the gas discharge conduit, no longer contained free oxygen nor $H_2S$ and had a temperature of 240° C. This effluent was cooled to approximately 130° C. in the condenser in order to separate therefrom the sulphur which it contained.

The conversion of $H_2S$ was complete and the selectivity of the sulphur was equal to 92%.

EXAMPLE 2

The treatment was carried out of a residual gaseous effluent containing, by volume, 0.8% of $H_2S$ as the only sulphur compound, this effluent being obtained by hydrogenation/hydrolysis of a residual gas from a Claus sulphur plant in which a sour gas containing 70% by volume of $H_2S$ was treated.

The said gaseous effluent was treated at a temperature below the dew point of the sulphur formed by the oxidation of the said $H_2S$ and by making use of a catalyst consisting of silicon carbide impregnated with a nickel compound and containing, by weight, 4% of nickel, the said catalyst having a BET specific surface of 220 $m^2/g$.

The said catalyst was obtained by impregnating microporous silicon carbide grains with an appropriate quantity of nickel acetate in aqueous solution, then drying the impregnated product at 100° C., and finally calcining the dried product at 300° C. for 3 hours. The silicon carbide grains, with a mean diameter of 1 mm, had a BET specific surface of 240 $m^2/g$.

The operation was carried out in a plant composed of two catalytic oxidation reactors fitted in parallel, each reactor having an entry and an exit separated by a stationary bed of the abovementioned catalyst. The said reactors were additionally arranged so that alternately, by means of valves which could be switched by a clock, one of the reactors operated in a reaction stage, that is to say had its entry connected to a gas delivery conduit, on which was fitted an indirect heat exchanger and, downstream of the exchanger, a branch connection for injection of air, and its exit connected to a gas discharge conduit, and the other reactor operated in a regeneration/cooling stage, that is to say was arranged in a regeneration/cooling circuit equipped with means for ensuring the circulation of a purging gas through the oxidation reactor starting from a heater as far as a sulphur condenser and return to the said heater and for subsequently circulating a cold gas, of the same composition as the regenerating gas, through the reactor which has undergone regeneration.

The gaseous effluent to be treated arrived via the gas delivery conduit with a flow rate equal to 940 kmol/h and was brought to a temperature of 90° C. in the exchanger fitted to the said conduit and then 44 kmol/h of ambient air were added via the branch connection. The mixture obtained entered into the reactor in the oxidation stage with a temperature substantially equal to 90° C. The contact time of the gas mixture, passing into the reactor in the oxidation reaction stage, with the catalyst layer present in the said reactor was equal to 10 seconds. The degree of conversion of $H_2S$, in the reactor in the oxidation reaction stage, was equal to 100%. At the exit of the said reactor, a gas stream was discharged which had a temperature of approximately 140° C. and contained 160 vpm of $SO_2$, the said gas stream being conveyed to an incinerator before being discharged to the atmosphere.

A purging gas was injected into the reactor operating in the regeneration/cooling stage for the purposes of regenerating the sulphur-laden oxidation catalyst, the said purging gas consisting of nitrogen and being injected into the said reactor with a temperature of between 250° C. and 350° C. and a flow rate equal to 10,000 $Nm^3/h$. On conclusion of the catalyst regeneration stage, the temperature of the purging gas was lowered to approximately 125° C. and the purging was continued with the cooled purging gas until the regenerated catalyst bed reaches substantially the said temperature. On regenerating under nitrogen, all the sulphur deposited on the catalyst is recovered.

The oxidation reactors operated alternately for 30 hours in the reaction stage and for 30 hours, 10 hours of which were for cooling, in the regeneration/cooling stage.

The sulphur plant, incorporating the process according to the invention for treating the residual gases produced by the said plant, which gases were hydrogenated prior to the treatment according to the invention, had an overall sulphur yield of 99.9% over a period of several months.

EXAMPLE 3

The treatment was carried out of an $H_2S$-depleted sour gas, the said gas consisting, by volume, of 95.5% of $CO_2$, 4% of $H_2O$ and 0.5% of $H_2S$.

The said sour gas was treated at a temperature below the dew point of the sulphur produced by oxidizing the $H_2S$ of this sour gas, the operation being carried out in a plant similar to that used in Example 2 and use being made of a catalyst composed of silicon carbide, containing 4% of nickel by weight and having a BET specific surface equal to 210 $m^2/g$. This catalyst was prepared as described in Example 2 and, after its calcination, it was reduced under a hydrogen stream at 400° C. for 10 hours.

The depleted sour gas to be treated arrived via the gas delivery conduit with a flow rate equal to 2241 $Nm^3/h$ and a temperature of approximately 30° C. and was brought to a temperature of 80° C. in the exchanger fitted to the said conduit, and then 89.6 $Nm^3/h$ of air, brought to 80° C., was added via the branch connection. The mixture obtained entered the reactor in the oxidation stage with a temperature substantially equal to 80° C. The contact time of the gas mixture, passing into the reactor in the oxidation reaction stage, with the catalyst layer present in the said reactor was equal to 10 seconds. The degree of conversion of $H_2S$, in the reactor in the oxidation reaction stage, was equal to 100%. At the exit of the said reactor, a gas stream was discharged which had a temperature of approximately 105° C. and contained less than 100 vpm of $SO_2$, the said gas stream being conveyed to an incinerator before being discharged to the atmosphere.

In the reactor operating in the regeneration/cooling stage, a purging gas consisting of nitrogen was injected for the purposes of regenerating the sulphur-laded oxidation catalyst, and then of cooling the regenerated catalyst, the operation being carried out as indicated in Example 2. On regenerating under nitrogen, all the sulphur deposited on the catalyst is recovered.

The oxidation reactors operated alternately for 30 hours in the reaction stage and for 30 hours, 10 hours of which were for cooling, in the regeneration/cooling stage.

EXAMPLE 4

The treatment was carried out of a sour gas containing, by volume, 20% of $H_2S$, 8% of water and 72% of $CO_2$ by a process comprising a catalytic oxidation stage in Claus stoichiometry followed by a Claus reaction stage carried out in two successive stages, the first above the dew point of the sulphur formed and the second below the said dew point.

The operation was carried out in a plant comprising the following components:

a stationary bed oxidation reactor containing an oxidation catalyst according to the invention, the said reactor being fitted with a conduit for delivering the mixture of sour gas and of air and with a conduit for discharging the effluent from the oxidation;

a gas/gas indirect heat exchanger, one of the exchange circuits of which is fitted in series to the conduit for delivering the mixture of sour gas and of air and the other exchange circuit of which is in series with the conduit for discharging the effluent from the oxidation;

a primary stationary bed catalytic converter which contains a Claus catalyst in the form of extrudates with a diameter of 3 mm composed of titanium oxide containing 10% by weight of calcium sulphate and the entry of which is connected to the conduit for discharging the oxidation effluent through the appropriate exchange circuit of the heat exchanger;

a catalytic conversion array comprising two secondary catalytic converters and a sulphur condenser cooled with steam, in which, on the one hand, each of the said secondary converters contains a Claus catalyst composed of an activated alumina in the form of balls with a diameter of 4 to 6 mm and, on the other hand, the secondary converters and the sulphur condenser are arranged so that the exit of the primary converter can be switched alternately to the entry of one or the other of the said secondary converters and so that the latter are connected in series through the sulphur condenser; and a catalytic incinerator, the entry of which is connected to the exit of the catalytic conversion array and the exit of which is connected to a chimney open to the atmosphere, this incinerator using a catalyst composed of a silica impregnated with iron sulphate and with palladium oxide.

The oxidation catalyst used in the oxidation stage in Claus stoichiometry was composed of a silicon carbide support impregnated with an iron compound and containing 4.6% by weight of iron with respect to the total weight of the catalyst.

The catalyst was prepared as follows. Silicon carbide grains, having a particle size of between 0.8 mm and 1 mm and a BET specific surface of 78 $m^2/g$, were first of all impregnated with an aqueous iron sulphate solution in a concentration such as to provide the desired quantity of iron in the resulting catalyst. The impregnated product obtained was dried and calcined as indicated in Example 1.

The catalyst obtained contained, as indicated above, 4.6% by weight of iron and had a BET specific surface equal to 76 $m^2/g$.

The sour gas arriving with a flow rate of 1000 $Nm^3/h$ (standard conditions) had 285.6 $Nm^3$/hour of air added to it and the gas mixture obtained was preheated to a temperature of 200° C., by passing into the heat exchanger, and was then injected into the oxidation reactor. The contact time between the gas mixture and the oxidation catalyst was equal to 2 seconds (standard conditions) and the temperature within the catalytic bed rose to 800° C.

The effluent from the oxidation reactor contained $H_2S$ and $SO_2$ in an $H_2S:SO_2$ molar ratio equal to 2:1, as well as 6 v.p.m. of free oxygen and a quantity of sulphur vapour corresponding to a degree of conversion of $H_2S$ to sulphur equal to 59%.

This effluent was cooled to 150° C. in the heat exchanger in order to condense the sulphur which it contains and to use a portion of the heat from the said effluent for preheating the mixture of sour gas and of air. The cooled effluent was then heated to 250° C. and conveyed into the primary Claus catalytic converter. The contact time between the catalyst, based on titanium oxide, and the gaseous effluent in the said converter was equal to approximately 3 seconds and the temperature within the catalytic bed was 300° C.

The reaction mixture containing $H_2S$, $SO_2$ and sulphur vapour resulting from the primary Claus converter was conveyed through the converter in the "regeneration" stage of the catalytic conversion array in order to carry out purging of the sulphur-laden catalyst present in this converter, the said purging being carried out at a temperature of approximately 300° C. with a gas/catalyst contact time of approximately 6 seconds. The sulphur-laden gas originating from the converter being regenerated then passed through the steam-cooled sulphur condenser, in which the said gas was cooled to a temperature of approximately 150° C. and freed from the sulphur which it contained by condensation. The resulting cooled gas, which contained $H_2S$ and $SO_2$ as well as a very small quantity of sulphur vapour, was conveyed into the catalytic converter in the "Claus reaction" stage of the catalytic conversion array operating at a temperature of 150° C., with a gas/catalyst contact time equal to approximately 6 seconds, in order to form sulphur by reaction between $H_2S$ and $SO_2$, the said sulphur being deposited on the catalyst.

The residual gases coming from the converter in the "Claus reaction" stage were conveyed to catalytic incineration and the smoke resulting from the incineration, which contained $SO_2$ at a very low concentration as the only sulphur compound, was discharged to the atmosphere via the chimney.

The residual gases exiting from the catalytic conversion array contained only 800 v.p.m. of total sulphur, namely $H_2S$, $SO_2$, sulphur vapour and/or vesicular sulphur, which corresponds to an overall yield for conversion of $H_2S$ to sulphur equal to 99.6%.

After an operating time of 800 hours, under the above-mentioned conditions, the effluent from the catalytic oxidation reactor in Claus stoichiometry contained $H_2S$ and $SO_2$ in an $H_2S:SO_2$ molar ratio equal to 2.02 and a quantity of sulphur vapour corresponding to a degree of conversion of $H_2S$ equal to 56%, the overall yield for conversion of $H_2S$ to sulphur then being 99.4%.

EXAMPLE 5

The treatment was carried out of a gas consisting, by volume, of 1% of $H_2S$, 5% of $H_2O$ and 94% of $CO_2$, the operation being carried out at temperatures above the dew point of the sulphur formed, with the use of a catalyst composed of a silicon carbide support impregnated with an iron compound and with a chromium compound and containing, expressed as weight of metal with respect to the weight of the catalyst, 3.2% of iron and 0.35% of chromium, the said catalyst being activated by a direct sulphurization.

The catalyst was prepared as follows. Silicon carbide grains, with a particle size of between 0.8 mm and 1 mm and a BET specific surface of 78 $m^2/g$, were first of all impregnated with a solution of an iron compound and of a chromium compound at concentrations such as to provide the desired quantities of iron and of chromium in the resulting catalyst. The impregnated product obtained was dried at ambient temperature for 40 hours and then at 120° C. for 50 hours and was then subjected to a calcination at 500° C. for 20 hours. The calcined product obtained, containing the elements iron and chromium in the oxide form supported on silicon carbide, was then treated either with $H_2S$ diluted to the concentration of 1% by volume in a helium flow or with solid sulphur mechanically mixed with the catalyst, the quantity of sulphur representing 6.2% of the weight of the said catalyst. The said treatment was implemented at 300° C. for two hours, in order to bring the metals iron and chromium to the sulphide form constituting the active phase of the catalyst.

The sulphur-containing catalyst obtained contained, as indicated above, 3.2% by weight of iron and 0.35% by weight of chromium and had a BET specific surface equal to 76 $m^2/g$.

The gas containing $H_2S$ was treated by using the sulphur-containing catalyst, the operation being carried out as indicated in Example 1.

The conversion of $H_2S$ was total from the beginning of the treatment of the gas containing $H_2S$ and the selectivity for sulphur was equal to 93%.

EXAMPLE 6

The treatment was carried out of an $H_2S$-depleted sour gas, the said gas consisting, by volume, of 95.5% of $CO_2$, 4% of $H_2O$ and 0.5% of $H_2S$.

The said sour gas was treated at 100° C., a temperature below the dew point of the sulphur produced by oxidizing the $H_2S$ of this sour gas, the operation being carried out in a plant similar to that used in Example 2 and use being made of a catalyst composed of silicon carbide containing 4% by weight of nickel and having a BET specific surface equal to 210 m²/g. This catalyst was prepared as described in Example 2 and, after its calcination, it was reduced under a hydrogen stream at 400° C. for 10 hours.

The depleted sour gas to be treated arrived via the gas delivery conduit with a flow rate equal to 2241 Nm³/h and a temperature of approximately 30° C. and was brought to a temperature of 80° C. in the exchanger fitted to the said conduit and then it was mixed, via the branch connection, with 89.6 Nm³/h of air and 1000 Nm³/h of an inert gas charged with 55% by volume of steam and brought to 100° C. The quantity of steam present in the final mixture was approximately 20% by volume. The mixture obtained entered the reactor in the oxidation stage with a temperature of 86° C. The contact time of the gas mixture, passing into the reactor in the oxidation reaction stage, with the catalyst layer present in the said reactor was equal to 10 seconds. The degree of conversion of $H_2S$, in the reactor in the oxidation reaction stage, was equal to 100%. At the exit of the said reactor, a gas stream was discharged which had a temperature of approximately 110° C. and contained less than 100 vpm of $SO_2$, which gas stream was conveyed to an incinerator before being discharged to the atmosphere.

A purging gas consisting of nitrogen was injected into the reactor operating in the regeneration/cooling stage for the purposes of regenerating the sulphur-laden oxidation catalyst, and then of cooling the regenerated catalyst, the operation being carried out as indicated in Example 2. On regenerating under nitrogen, all the sulphur deposited on the catalyst is recovered.

The presence of the abovementioned quantity of steam in the reaction mixture and more generally of a quantity of between 10% and 50% and especially lying between 15% and 30% by volume makes it possible to substantially extend the period of time during which the optimum desulphurizing activity of the catalyst is maintained. The steam acts as dispersant for the sulphur deposited on the catalyst and thus protects access of the reactants to the active sites of the catalyst.

What is claimed is:

1. A process for catalytically oxidizing the $H_2S$ present at a low concentration in a gas to sulphur, which comprises subjecting, prior to the oxidation of the $H_2S$, a catalyst for selectively oxidizing $H_2S$ to sulphur comprised of a support based on silicon carbide associated with the catalytically active phase containing at least one metal existing in the oxide form or in the elemental state or both to an activation treatment and contacting said gas containing $H_2S$ with a gas containing free oxygen, in a quantity such as to provide an $O_2$:$H_2S$ molar ratio ranging from 0.05 to 10, with the catalyst, wherein said contacting occurs below 500° C., the activation treatment being carried out by contacting the oxidation catalyst with a gas mixture containing $H_2S$ and an inert gas, while operating at temperatures between 250° C. and 400° C. and for a period of time of between 1 hour and 15 hours, to provide maximum sulphurization of the metal of the active phase of the catalyst.

2. The process according to claim 1, wherein the active phase of the oxidation catalyst comprises at least one transition metal, wherein the metal is in the oxide, and/or in the elemental state.

3. The process according to claim 2 wherein the transition metal is selected from the group consisting of nickel, cobalt, iron, copper, silver, manganese, molybdenum, chromium, titanium, tungsten and vanadium.

4. The process according to claim 1, wherein the silicon carbide support of the oxidation catalyst forms at least 40% by weight of the catalyst.

5. The process according to claim 4 wherein the silicon carbide support of the oxidation catalyst forms at least 50% by weight of the catalyst.

6. The process according to claim 5 wherein the active phase of the catalyst is between 0.2 to 7% of the weight of the catalyst.

7. The process according to claim 1, wherein the active phase of the oxidation catalyst, expressed as weight of metal, represents 0.1 to 20% of the weight of the catalyst.

8. The process according to claim 7 wherein the active phase of the oxidation catalyst, expressed as weight of metal, represents 0.2 to 15% of the weight of the catalyst.

9. The process according to claim 1, wherein the specific surface of the catalyst, determined by the BET nitrogen adsorption method, has a value ranging from 2 m²/g to 600 m²/g.

10. The process according to claim 1, wherein the gas containing free oxygen is in a quantity such as to provide an $O_2$:$H_2S$ molar ratio ranging from 0.1 to 7.

11. The process according to claim 10 wherein the gas containing free oxygen is in a quantity such as to provide an $O_2$:$H_2S$ molar ratio ranging from 0.2 to 4.

12. The process according to claim 1, wherein the contact time of the gaseous reaction mixture with the oxidation catalyst, ranges from 0.5 second to 20 seconds.

13. The process according to claim 12 wherein the contact time is between 1 second and 12 seconds.

14. The process according to claim 1, wherein the oxidation of $H_2S$ in contact with the catalyst is carried out at a temperature between 30° C. and 500° C.

15. The process according to claim 14, wherein the oxidation of $H_2S$ in contact with the catalyst is carried out at a temperature between 180° C. and 500° C.

16. The process according to claim 15 wherein the oxidation is carried out at a temperature between 200° C. and 900° C.

17. The process according to claim 14, wherein the oxidation of $H_2S$ in contact with the catalyst is carried out at a temperature below the dew point of the sulphur formed by the oxidation, the temperature being in the range of 30° C. to 180° C.

18. The process according to claim 17, wherein the sulphur-laden oxidation catalyst is periodically subjected to regeneration by purging with a gas, the operation being carried out at a temperature between 200° C. and 500° C., to vaporize the sulphur retained on the catalyst, and the regenerated catalyst is then cooled to a temperature below the dew point of the sulphur for a new implementation of the oxidation of $H_2S$, the cooling being carried out with a gas which is at a temperature below 180° C.

19. The process according to claim 18 wherein the regeneration temperature is between 230° C. and 450° C.

20. The process according to claim 17 wherein the oxidation is carried out a temperature between 80° C. to 160° C.

21. The process according to claim 1, wherein the $H_2S$ content of the gas to be treated is between 0.001% and 25% by volume.

22. The process according to claim 21 wherein the $H_2S$ content of the gas to be treated is between 0.01% to 20% by volume.

23. The process according to claim 1, wherein the reaction for oxidizing $H_2S$ is implemented in Claus stoichiometry by bringing the gas to be treated containing $H_2S$ into contact, in the presence of the oxidation catalyst containing a silicon carbide support and at temperature between 200° C. and 500° C., with a controlled quantity of the gas containing free oxygen, in order to form a gaseous effluent containing $H_2S$ and $SO_2$ in an $H_2S:SO_2$ molar ratio which is substantially equal to 2:1 and a quantity of sulphur, and bringing the gaseous effluent, after cooling, into contact with a Claus catalyst in order to form a new quantity of sulphur.

24. The process according to claim 23 wherein the temperature of contact is between 350° C. and 500° C.

25. A process for catalytically oxidizing the $H_2S$ present at a low concentration in a gas to sulphur, which comprises contacting the said gas containing $H_2S$ with a gas containing free oxygen, in a quantity such as to provide an $O_2:H_2S$ molar ratio ranging from 0.05 to 10, with a catalyst for selectively oxidizing $H_2S$ to sulphur comprised of a support based on silicon carbide in association with a catalytically active phase containing at least one metal existing in the form of a metal oxide in the elemental state or both, the oxidation of the $H_2S$ in contact with the catalyst being carried out at a temperature ranging from 90° C. to 140° C. the sulphur formed by said oxidation being deposited on the catalyst.

26. The process according to claim 25, wherein the metal of the active phase of the oxidation catalyst is a transition metal selected from the group consisting of nickel, cobalt, iron, copper, silver, manganese, molybdenum, chromium, titanium, tungsten and vanadium.

27. The process according to claim 25, wherein the silicon carbide support of the oxidation catalyst forms at least 40% by weight of the catalyst.

28. The process according to claim 27, wherein the silicon carbide support of the oxidation catalyst forms at least 50% by weight of the catalyst.

29. The process according to claim 25, wherein the active phase of the oxidation catalyst forms at least 20% of the weight of the catalyst.

30. The process according to claim 29, wherein the active phase of the oxidation catalyst forms at least 15% of the weight of the catalyst.

31. The process according to claim 29, wherein the active phase of the oxidation catalyst forms at least 7% of the weight of the catalyst.

32. The process according to claim 25, wherein the specific surface of the oxidation catalyst, determined by the BET nitrogen adsorption method, has a value ranging from 2 $m^2/g$ to 600 $m^2/g$.

33. The process according to claim 25, wherein the gas containing free oxygen is in a quantity such as to provide an $O_2:H_2S$ molar ratio ranging from 0.1 to 7.

34. The process according to claim 33, wherein the gas containing free oxygen is in a quantity such as to provide an $O_2:H_2S$ molar ratio ranging from 0.2 to 4.

35. The process according to claim 25, wherein the contact time of the gaseous reaction mixture with the oxidation catalyst ranges from 0.5 second to 20 seconds.

36. The process according to claim 35, wherein the contact time is between 1 second and 12 seconds.

37. The process according to claim 25, wherein the sulphur-laden oxidation catalyst is periodically subjected to regeneration by purging with a gas, the operation being carried out at a temperature between 200° C. and 500° C., to vaporize the sulphur retained on the catalyst, and the regenerated catalyst is then cooled to a temperature below the dew point of sulphur for a new implementation of the oxidation of $H_2S$, the cooling being carried out at a temperature below 180° C.

38. The process according to claim 37, wherein the regeneration temperature is between 230° C. and 450° C.

39. The process according to claim 25, wherein the $H_2S$ content of the gas to be treated is between 0.001% and 25% by volume.

40. The process according to claim 39, wherein the $H_2S$ content of the gas to be treated is between 0.001% and 20% by volume.

41. A process for catalytically oxidizing the $H_2S$ present at a low concentration in a gas to sulphur, which comprises passing the said gas containing $H_2S$ with a gas containing free oxygen, in a quantity such as to provide an $O_2:H_2S$ molar ratio ranging from 0.05 to 10, in contact with a catalyst for selectively oxidizing $H_2S$ to sulphur comprised of a support based on silicon carbide in association with a catalytically active phase containing at least one metal existing in the form of a metal compound and/or in the elemental state and selected from the group consisting of copper, silver, manganese and tungsten, and wherein the oxidation of the $H_2S$ in contact with the catalyst is carried out at temperatures between 200° C. and 500° C.

42. The process according to claim 41, wherein the silicon carbide support of the oxidation catalyst forms at least 40% by weight of the catalyst.

43. The process according to claim 42, wherein the silicon carbide support of the oxidation catalyst forms at least 50% by weight of the catalyst.

44. The process according to claim 41, wherein the active phase of the oxidation catalyst forms at least 20% of the weight of the catalyst.

45. The process according to claim 44, wherein the active phase of the oxidation catalyst forms at least 15% of the weight of the catalyst.

46. The process according to claim 44, wherein the active phase of the oxidation catalyst forms at least 7% of the weight of the catalyst.

47. The process according to claim 41, wherein the specific surface of the oxidation catalyst forms at least 600 $m^2/g$.

48. The process according to claim 41, wherein the gas containing free oxygen is in a quantity such as to provide an $O_2:H_2S$ molar ratio ranging from 0.1 to 7.

49. The process according to claim 48, wherein the gas containing free oxygen is in a quantity such as to provide an $O_2:H_2S$ molar ratio ranging from 0.2 to 4.

50. The process according to claim 41, wherein the contact time of the gaseous reaction mixture with the oxidation catalyst ranges from 0.5 second to 20 seconds.

51. The process according to claim 50, wherein the contact time is between 1 second and 12 seconds.

52. The process according to claim 41, wherein the $H_2S$ content of the gas to be treated is between 0.001% and 25% by volume.

53. The process according to claim 52, wherein the $H_2S$ content of the gas to be treated is between 0.001% and 20% by volume.

54. The process according to claim 41, wherein the reaction for oxidizing $H_2S$ is implemented in Claus stoichiometry by bringing the gas to be treated containing $H_2S$ into contact, in the presence of the oxidation catalyst containing a silicon carbide support and at a temperature between 350° C. and 500° C., with a controlled $H_2S$ quantity of the gas containing free oxygen, in order to form a gaseous effluent containing $H_2S$ and $SO_2$ in an $H_2S:SO_2$ molar ratio which is substantially equal to 2:1 and a quantity of sulphur, and bringing the gaseous effluent, after cooling, into contact with a Claus catalyst in order to form a new quantity of sulphur.

55. A catalyst for selectively oxidizing $H_2S$ to sulphur, comprising a catalytically active phase in combination with a support comprised of silicon carbide, said supporting representing at least 40% of the weight of the catalyst and the active phase containing at least one metal existing in the form of a metal oxide and/or in the elemental state and selected from the group consisting of copper, silver, manganese and tungsten, which catalyst has been activated by loading the metal of the active phase of the catalyst with sulphur at a temperature between 250° C. and 400° C. and under an inert atmosphere to produce its maximum sulphurization.

56. The activated catalyst of claim 55 where the loading of the metal of the active phase results from the exposure of the catalyst to elemental sulphur or a $H_2S$-containing gas mixture.

57. A process for catalytically oxidizing $H_2S$ present at a low concentration in a gas to sulphur, which comprises subjecting, prior to the oxidation of $H_2S$, a catalyst for selectively oxidizing $H_2S$ to sulphur comprised of a support based on silicon carbide associated with a catalytically active phase containing at least one metal existing in the oxide form or in the elemental state or both and selected from the group consisting of nickel, cobalt, copper, silver, manganese, molybdenum, chromium, titanium, tungsten and vanadium, to an activation treatment, and contacting the said gas containing $H_2S$ with a gas containing free oxygen, in a quantity such as to provide an $O_2:H_2S$ molar ratio ranging from 0.05 to 10, with the catalyst, the activation treatment being carried out by contacting the oxidation catalyst with sulphur, in a quantity representing up to 300 mol % excess of the quantity corresponding to the maximum sulphurization of the metal of the active phase of the catalyst, the said contacting being performed under an inert atmosphere and at temperatures of between 250° C. and 400° C.

* * * * *